July 7, 1925.
F. R. HARTSOCK
WHEEL PITCH GAUGE
Filed Nov. 16, 1923
1,544,980
2 Sheets-Sheet 1
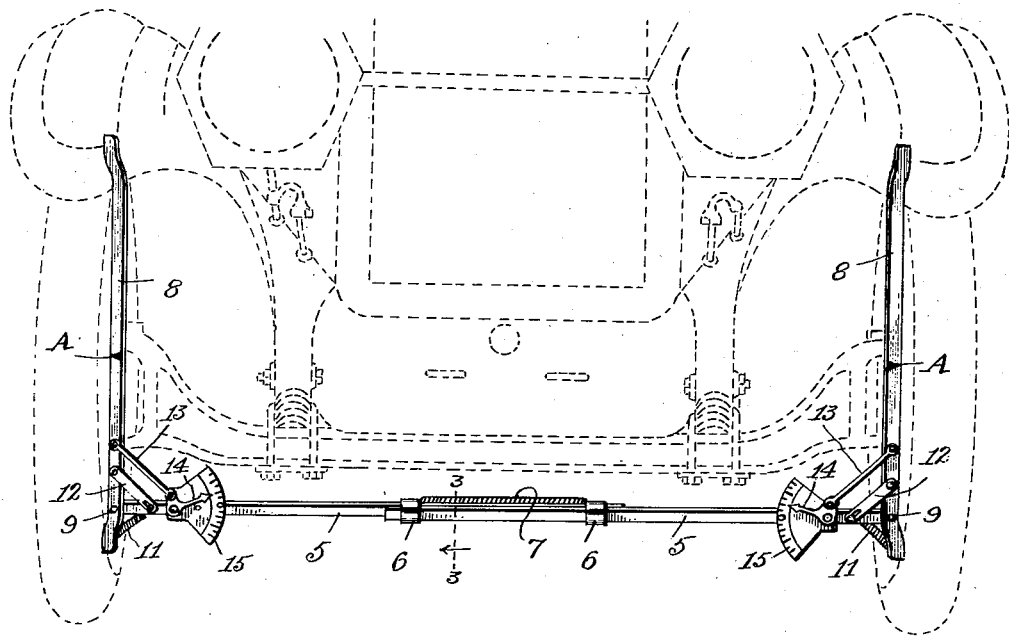
Inventor
Frank R. Hartsock
Charles C. Buckley
By
Attorneys July 7, 1925. 1,544,980
F. R. HARTSOCK
WHEEL PITCH GAUGE
Filed Nov. 16, 1923 2 Sheets-Sheet 2

Inventor
Frank R Hartsock
By Charles C. Buckley
Attorney

Patented July 7, 1925.

1,544,980

UNITED STATES PATENT OFFICE.

FRANK R. HARTSOCK, OF WARSAW, INDIANA, ASSIGNOR OF ONE-THIRD TO CHARLES O. DICKEY AND ONE-THIRD TO LEONARD E. DICKEY, BOTH OF WARSAW, INDIANA.

WHEEL-PITCH GAUGE.

Application filed November 16, 1923. Serial No. 675,185.

*To all whom it may concern:*

Be it known that I, FRANK R. HARTSOCK, a citizen of the United States of America, and a resident of Warsaw, county of Kosciusko, and State of Indiana, have invented certain new and useful Improvements in Wheel-Pitch Gauges, of which the following is a full and clear specification.

As is well known, it is desirable to slightly incline the spindles of the vehicle axle downwardly and outwardly to thus cause the wheels to incline slightly upwardly and outwardly, this inclination being called the camber or pitch; and it is also well known that it is desirable to incline the spindles of the front, steering wheels of a motor vehicle slightly forwardly to cause the wheels to slightly converge forwardly, this converging position being referred to in the trade as the "toe-in." It is the object of my application to enable one to quickly and easily gauge the camber and "toe-in" or pitch of vehicle wheels with a view of determining whether or not they are functioning properly, it being of the utmost importance to properly set the wheels in order to avoid undue wear of the pneumatic tires.

In the drawing—

Fig. 1 is a perspective view of my apparatus positioned to indicate the pitch or camber of the front wheels of a motor vehicle;

Fig. 2 is a perspective view of one-half of the apparatus positioned to indicate the fore-and-aft pitch (known in the trade as "toe-in") of the wheels.

Fig. 3 is a transverse section on the line 3—3 of Fig. 1;

Figure 4:
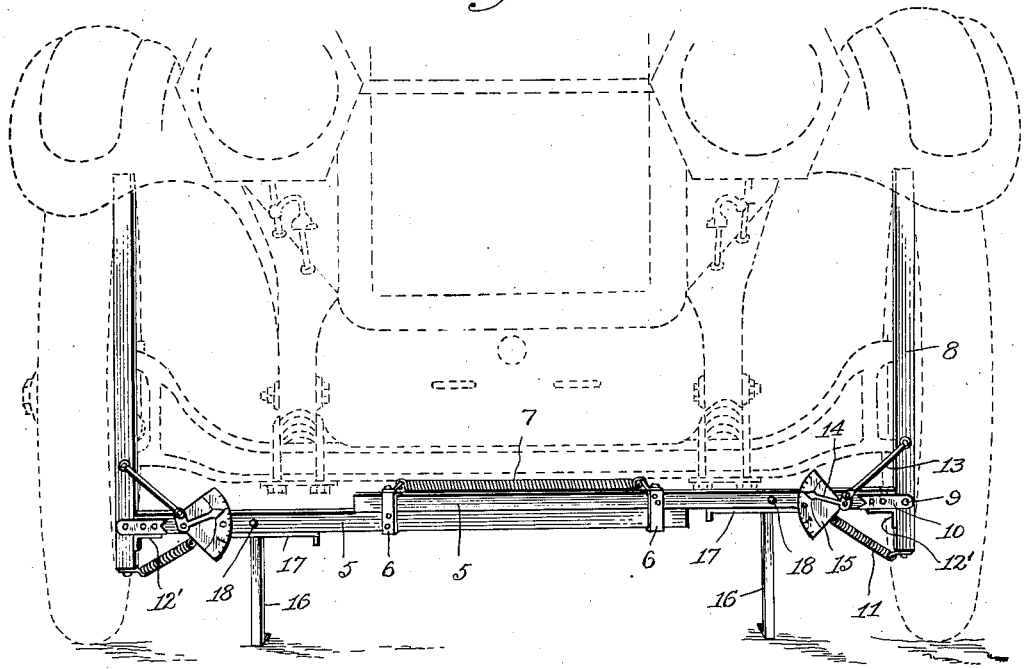
Fig. 4 is a view similar to Fig. 1, showing a slightly modified form of the apparatus.

My device consists, in its preferred form, of a pair of bars 5 overlapped upon each other and adapted to relatively slide, these two bars being held in their overlapped position by means of a pair of loops 6, one being rigidly attached to each of the bars. A retractile spring 7 is employed for normally tending to endwisely separate or extend the bars, this spring being arranged parallel to the bars and being connected at its opposite ends to the aforesaid loops 6. The bars 5 are in the form of angle-irons and the overlapping ends of the bars nest one within the other; and the retractile spring 7 lies within the channel formed by the flanges of the inner bar.

A gauge-bar 8, preferably of angle-iron, is pivoted at 9 to the outer end of each of the supporting-bars 5, a retractile spring 11 being employed to normally tend to swing the free end of the gauge-bar outwardly. A link 12, connecting the gauge-bar to the adjacent supporting-bar 5, arrests the swinging of the gauge-bar inwardly as well as outwardly, this link 12 being pivotally connected at one end to the gauge-bar and at its other end by a pin-and-slot connection to the supporting-bar 5; and the length of the link 12 is such that it holds the gauge-bar normally in a position at an oblique angle to the supporting-bar 5. The spring 11 extends from the adjacent short end of the gauge-bar to the adjacent supporting-bar and thus tends to pull the said short end inwardly and the long end of the gauge-bar outwardly to the limit of the restraining link 12. Connected to each gauge-bar at a point in front of the link 12 is a link 13, the inner end of this link 13 being connected to one arm of an indicator-finger 14 pivotally mounted to move across the graduated scale-plate 15, the parts being so arranged and proportioned that when the gauge-bar is in its normal, oblique position, the indicator-finger will be at zero on the scale-plate.

The manner of using the device is obvious from an inspection of the drawings. The two supporting-bars 5 are slid inwardly on each other, against the action of the spring 7, and the gauge-bar is then passed between the pair of wheels to be gauged; then the supporting-bars are released to permit the spring 7 to normally slide the supporting-bars outwardly until the gauge-bars rest against the rims of the wheels, on the inner faces thereof. The relative inclination of the wheels will thus be indicated on the scale-plates.

In gauging the camber of the wheels, the gauge-bars 8 are, of course, placed in an upright position against the inner faces of the wheels, as shown in Fig. 1, at a point in front of or in the rear of the axle; and when gauging for "toe-in," the gauge-bars are placed in a horizontal position at a point below the axle.

A feature of great importance in my appliance lies in the idea of attaching the gauge-bars to the supporting-bars at or near the extreme forward ends of the gauge-bars, so that in gauging either camber or "toe-in," the supporting-bars will lie out in front of the vehicle, so that it will be possible not only to conveniently read the scales, but also to conveniently manipulate the apparatus. This convenience in manipulation is especially of importance when the apparatus is used for gauging the front wheels of modern motor vehicles, in which the springs extend forward from the axle and the bumper is usually mounted in front of the springs. With my appliance, either kind of gauging of the wheels may be accomplished without in the least being interfered with by the bumper or the springs or the wheel-fenders, and the scales will lie in such position that they may be read without inconvenience.

In manipulating the device, I prefer to first contract the supporting-bars far enough to permit the gauge-bars to be easily inserted between the wheels and hold the bars in this contracted position by grasping them in one hand at a point between the loops 6; then, by letting up slightly and gradually on the grip, the supporting-bars are allowed to slide outwardly until the ends of the gauge-bars 8 rest against the rims of the wheels. My present construction greatly facilitates this simple way of applying the tool to the wheels, since the use of overlapping angle-irons as supporting-bars not only gives ample friction on the surface between the two bars, but also forms a shield or housing for the spring 7, so that the spring may be enveloped by the hand when the bars are gripped. As a matter of fact, the spring, by being thus located in a longitudinal cavity in one of the bars, assists in rounding out the gripping portion of the structure, thereby rendering it easier to hold the supporting-bars contracted with one hand. Thus being able to hold the supporting-bars in contracted position with one hand only leaves the other hand free to assist in properly positioning the gauge-bars against the rims.

Another feature of importance is the link 12, the length of whose slot is such as to restrict the inward as well as the outward swinging of the gauge-bar. The restriction of the outward swinging of the gauge-bar is important in that the gauge-bars are thus held in convenient position for application to the wheels, and the restricting of the gauge-bars in the opposite swinging movement is important in that it prevents the breaking or derangement of the scale mechanism. I prefer placing a mark "A" at a point mid-length of each of the gauge-bars 8 to assist the operator in centralizing the gauge when it is applied to the wheel. By sighting from this mark to the hub, the gauge-bars may be centralized with sufficient accuracy for all practical purposes.

Figure 5:
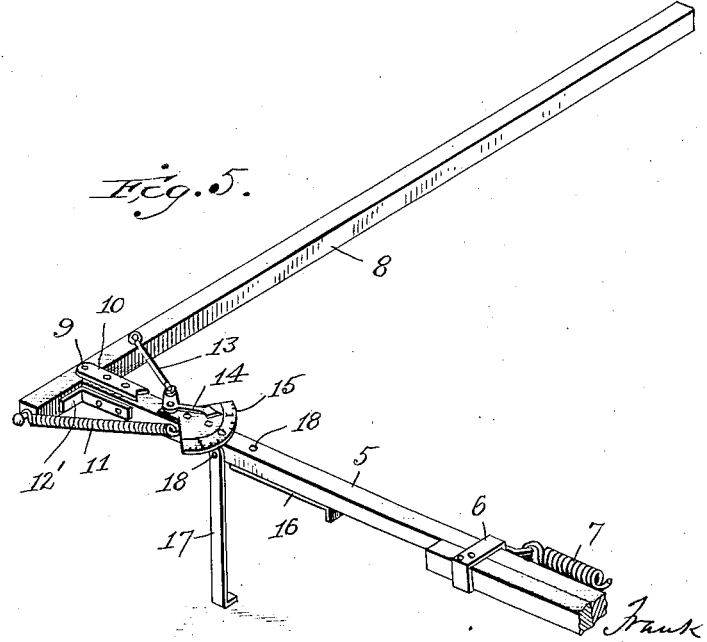
Fig. 5 is a view similar to Fig. 2 of this modified apparatus.

In the modification shown in Figs. 4 and 5, I show the supporting-bars 5 and the gauge-bars 8 as being constructed of wooden members rectangular in cross-section; with this shape of supporting-bar, it will be impossible, of course, to house the spring 7, but nevertheless the spring will lie in such position as to be grasped in the hand when the supporting-bars are held contracted preparatory to applying the apparatus to the wheels. Instead of pivoting the gauge-bars 8 directly to the supporting-bars 5, I pivot the wooden gauge-bars 8 to a pair of metal plates 10 which are fastened to the supporting-bars; instead of the link 12, I employ an angular stop 12' fastened to the rear face of the supporting-bar. In this modified form of the apparatus, I also show two pairs of supporting legs 16 and 17. When the gauge is positioned for camber, as in Fig. 4, the supporting-bars are supported at the proper distance upon the ground or floor by means of the pair of legs 16 pivoted to the supporting-bars in such manner as to be swung to a position parallel with the supporting-bars when not in use, as shown in Fig. 5, where they will be held by friction. The companion set of legs 17 is employed for supporting the supporting-bars when the appliance is used for gauging "toe-in," as shown in Fig. 5, in which position, of course, the gauge-bars will extend fore-and-aft of the wheels and rest against the inner faces thereof below the axle. It will be observed that the pivots 18 of the two sets of legs lie at right-angles to each other, so that when one set of legs is in use the other set may be swung to a position out of the way.

What I claim is:

1. A wheel-gauge consisting of a pair of supporting-bars and a spring normally tending to endwisely separate the same, a gauge-bar pivotally mounted at one end of the outer end of each of said bars, springs for normally tending to swing the gauge-bars outwardly at their free ends, links for restricting the inward as well as the outward swinging of the gauge-bars, and scale means connected to the gauge-bars.

2. A wheel-gauge consisting of a pair of overlapping supporting-bars slidable one on the other, guiding loops, a retractile spring connecting the said bars together and lying parallel therewith at their overlapping portions, and a wheel-gauging means mounted on the outer end of each of said supporting-bars, said supporting-bars consisting of angle-irons nested where they overlap and said spring being arranged to lie within the channel formed by the inner supporting-bar, said guiding loops each being affixed to one of the angle-irons at overlapping points and being arranged to embrace both angle-irons.

3. A wheel-gauge embodying an extensible frame and a gauge-bar connected to each of the outer ends of said frame, and two sets of supporting-legs pivoted at right-angles to each other on said supporting-frame, for the purpose set forth.

Signed by me at Warsaw, Kosciusko County, Indiana, this 13th day of November, 1923.

FRANK R. HARTSOCK.